United States Patent [19]

Haslam et al.

[11] Patent Number: 5,414,263
[45] Date of Patent: May 9, 1995

[54] INFRARED DETECTION SWITCHING CIRCUIT

[75] Inventors: Gary M. Haslam, Graham; David E. Van den Bout, Apex, both of N.C.

[73] Assignee: Regent Lighting Corporation, Burlington, N.C.

[21] Appl. No.: 201,263

[22] Filed: Feb. 24, 1994

[51] Int. Cl.[6] ............................................. G01J 5/34
[52] U.S. Cl. .................... 250/338.1; 250/342; 250/DIG. 1
[58] Field of Search ............... 250/338.1, 338.2, 338.3, 250/342, DIG. 1; 340/565, 567, 562

[56] References Cited

U.S. PATENT DOCUMENTS

| | | | |
|---|---|---|---|
| 3,914,753 | 10/1975 | Cho | 340/512 X |
| 3,963,919 | 6/1976 | Sells | 250/231.16 |
| 3,988,726 | 10/1976 | Reiss et al. | 340/258 |
| 4,300,048 | 11/1981 | Barbier et al. | |
| 4,418,335 | 11/1983 | Genähr | 250/DIG. 1 X |
| 4,521,768 | 6/1985 | Haran et al. | 340/566 |
| 4,618,770 | 10/1986 | Maile | 250/DIG. 1 X |
| 4,825,079 | 4/1989 | Takamatsu et al. | 250/338.3 |
| 4,929,833 | 5/1990 | Smith | 250/338.1 |
| 4,943,712 | 7/1990 | Wilder | 250/221 |
| 4,952,808 | 3/1990 | Turnbull et al. | 250/338.3 |
| 5,276,427 | 1/1994 | Peterson | 340/565 |

FOREIGN PATENT DOCUMENTS 86369  8/1983  European Pat. Off. ...... 250/DIG. 1

Primary Examiner—Constantine Hannaher
Assistant Examiner—Edward J. Glick
Attorney, Agent, or Firm—Rhodes, Coats & Bennett

[57] ABSTRACT

A passive infrared detection and conversion circuit includes a pyrosensor, a current amplifier, a capacitor, and a signal processor circuit. The signal processor is operable to charge the capacitor to a first voltage level and to measure a capacitor discharge time, the time required for the capacitor to discharge from the first voltage level to a second voltage level. The signal processor is further operable to generate an electrical control signal responsive to a variation in the capacitor discharge time which corresponds to a significant motion event. When the pyrosensor is exposed to infrared motion, it generates a transient current, and the capacitor discharge time corresponds to the transient current. The signal processor circuit includes logic operable to compare the capacitor discharge time with a long-term average capacitor discharge time. The signal processor circuit generates the electrical control signal only when the capacitor discharge time deviates from the long-term average capacitor discharge time by exceeding a predetermined threshold margin and/or satisfying other timing and/or pulse sequence patterns. The logic of the signal processor circuit may be further operable to calculate and update the long-term average capacitor discharge time based on the capacitor discharge time such that the logic filters out unwanted background signals and component tolerance variations, thereby creating a dynamic threshold system for detecting significant motion.

13 Claims, 3 Drawing Sheets

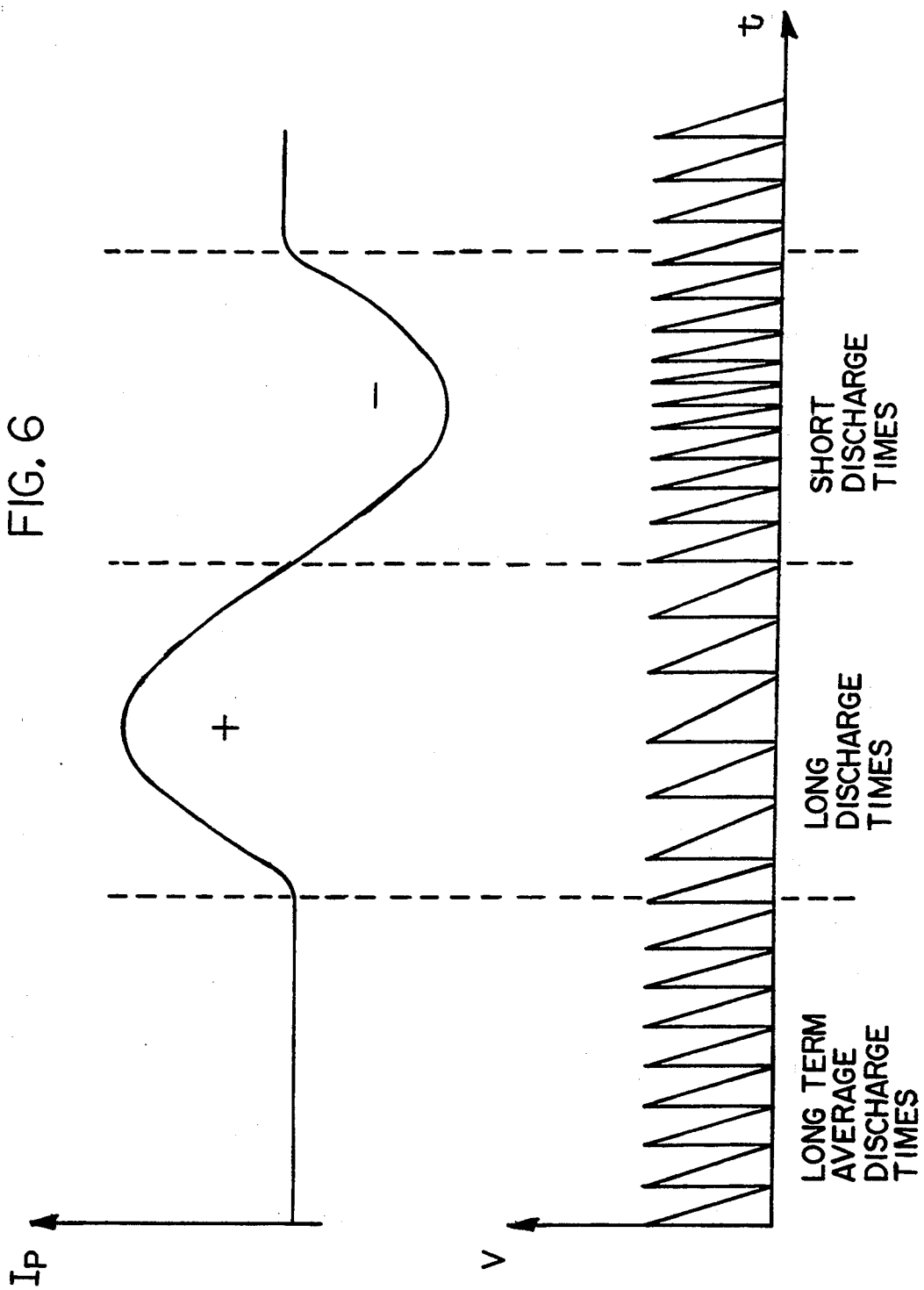

INFRARED DETECTION SWITCHING CIRCUIT

FIELD OF THE INVENTION

The present invention relates to infrared detection apparatus and methods, and, more particularly, to an improved infrared detection and signal conversion circuit for detecting motion and electrically activating a switching device.

BACKGROUND OF THE INVENTION

Infrared detection and control circuits which use pyrosensor devices as thermal detectors are well-known. They are used for a variety of different purposes such as controlling lights, appliances, security devices, and electrical equipment. A pyrosensor generally consists of a layer of pyroelectric material sandwiched between two electrodes. When the temperature of the pyroelectric material changes, for example, as a result of the incidence on the element of infrared radiation from a scene being viewed, electrical charges are generated at the electrodes. The pyroelectric charge is generated only when the temperature of the element is changed. The required change in temperature may be caused by any motion radiating infrared or blocking infrared radiating within the scene viewed, for example, a person moving across a surveillance region.

It is necessary to convert the temperature change into a usable signal. Conventional methods of passive infrared detection and conversion use one or more amplifier circuits to amplify the small electric voltage generated by the pyrosensor. The signal is then filtered using high and low band-pass techniques and then fed to a signal processing circuit for analysis. The signal processing circuit in turn controls a power switch or similar device or devices.

Passive infrared detection and conversion circuits of the prior art are typically developed by setting fixed threshold voltages and providing amplifiers to produce signals corresponding to this threshold voltage level.

The conventional methods referenced above utilize band-pass filtering components to filter out small spurious or unwanted electrical signals operated by the pyrosensors which are typically caused by environmental elements such as rain and wind. Increased infrared activity also occurs during colder seasons when small infrared heat images, normally undetectable, appear larger in the cold air and become detectable. Characteristics of these spurious signals include short high-frequency cycles or constant or slow increasing/decreasing low-frequency cycles over time. Because conventional detection methods rely on fixed signal thresholds, unwanted signals can only be filtered out at the expense of sensitivity.

Measuring time variations proportional to the current output of a pyroelectric infrared detector is shown in U.S. Pat. No. 4,929,833 to Smith. The Smith patent discloses a digital infrared detector circuit which converts changes in detector current to time varying pulses and uses feedback to adjust the coincidence of a reference signal with the trigger signal to accommodate circuit variations caused by changes in infrared sensor sensitivities or ambient temperature. To supply a highly accurate feedback reference signal an internal high frequency oscillator is used for feedback control and counted down to furnish the reference signal. The conversion from detector current to time is accomplished by using the detector to discharge an accurately charged capacitor and measuring the time to recharge the capacitor.

The invention disclosed in the Smith patent has several drawbacks. First, the detector circuit depends on both the discharge and recharge time of the capacitor to determine the detector current, requiring accurate measurement of two different time periods. Second, the detector circuit as disclosed samples only about eight times per second, necessitating the use of a relatively low frequency clock. Thirdly, the detector uses a digital clock generator, a reference pulse generator, a sample pulse generator, and a trigger circuit, all of which make the circuit relatively expensive to manufacture. The detector of the Smith patent compensates for long-term drift in the analog front-end electronics by adjusting the bias of the detector to reduce the difference between the capacitor recharge time and the reference time intervals, thereby compensating the circuit itself.

Thus, there exists a need for a low cost infrared detection and conversion circuit for detecting motion and activating a switching device to control lights, appliances, and electrical equipment and other devices. There exists a need for such an infrared detection and conversion circuit which uses common, low cost electronic components, and which reduces the number of components required to effectively detect and convert passive infrared signals to electric signals for processing. Further, there exists a need for a reliable circuit design that supports wide component tolerances inherent in common components and even component substitutions without significantly impacting the signal processing portion of the circuit.

SUMMARY OF THE INVENTION

The present invention is directed to a reliable, low cost infrared detection and conversion circuit and method (particularly applicable to passive infrared systems) for detecting motion and activating a switching device. The circuit includes a capacitor which discharges at a known rate and is connected by a current amplifier such as a transistor to a pyrosensor. When the pyrosensor detects infrared motion, it generates a positive or negative transient current which, when amplified by the current amplifier, causes an increase or decrease in the discharge rate of the capacitor. A signal processor circuit, preferably a microprocessor, which is provided with suitable algorithms, charges the capacitor and then measures the time required for the capacitor to discharge to a predetermined level. The signal processor determines whether the discharge rate of the capacitor has deviated from a predetermined "normal" or long-term-average discharge time and, if so, the signal processor determines whether the deviation constitutes a significant motion event. If the signal processor registers a significant motion event, it then activates the switching device.

The signal processing circuit also continually monitors and dynamically recalculates the long-term-average discharge time to account for background infrared activity, such as infrared activity caused by rain, wind and cold and automatically adjusts threshold levels corresponding to signal activity. Furthermore, the circuit and method of the present invention automatically adjust for use with different components having different operating specifications or tolerances, such as different pyrosensors, maintaining a consistent level of performance.

It is an object of the present invention to provide a reliable, low cost infrared detection and conversion circuit for detecting motion and activating a switching device.

It is another object of the present invention to provide an infrared detection and conversion circuit which creates measurable variations in the discharge rate of the capacitor to determine if motion has occurred.

Another object of the present invention is to provide a passive infrared detection and conversion circuit as described above which adjusts for changes in background infrared radiation motion and component tolerance variations.

Another object of the present invention is to provide a passive infrared detection and conversion circuit which may be used interchangeably with other detector components, such as different pyrosensors, without modification.

Yet another object of the present invention is to provide a method for detecting motion in a surveillance region by creating measurable variations in the discharge rate of a capacitor, which variations are compared to a predetermined discharge rate by a microprocessor.

These and other objects of the present invention will become apparent from a study of the following description of a preferred embodiment of the present invention.

BRIEF DESCRIPTION OF THE DRAWINGS

FIG. 6 represents the motion waveform for the circuit of the present invention for an entire motion cycle.

DETAILED DESCRIPTION OF THE PREFERRED EMBODIMENT

Figure 1:
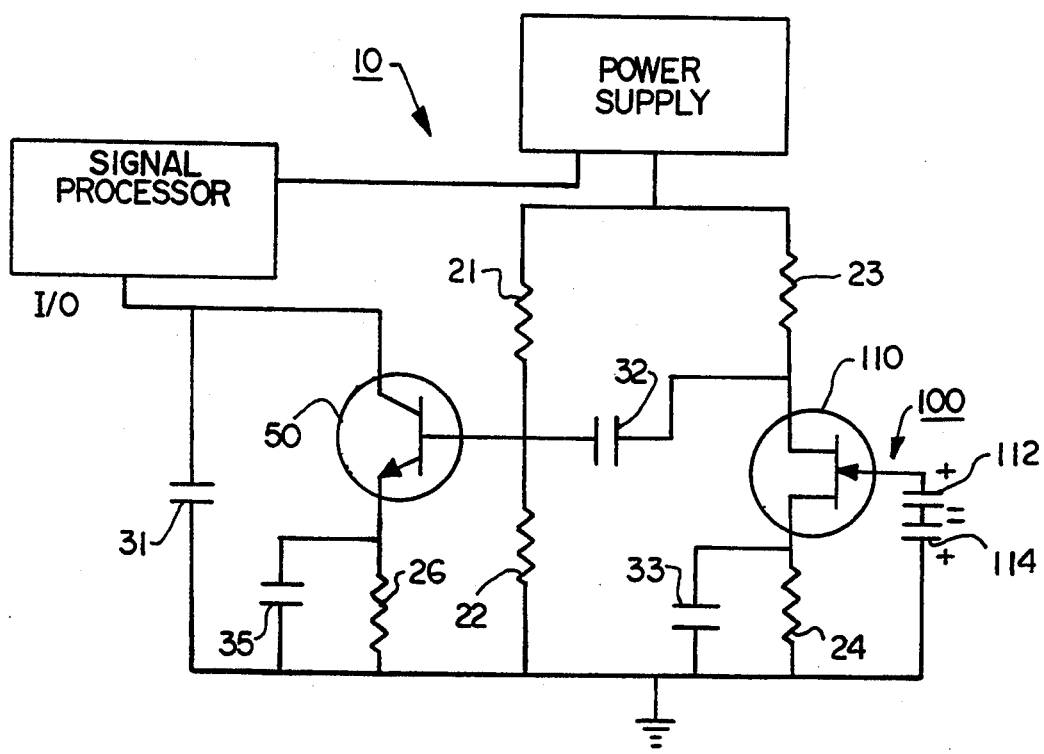
FIG. 1 is a circuit diagram of the passive infrared detection and conversion circuit of the present invention.

In the following description, like reference characters designate like or corresponding parts throughout the several views.

Figure 2:
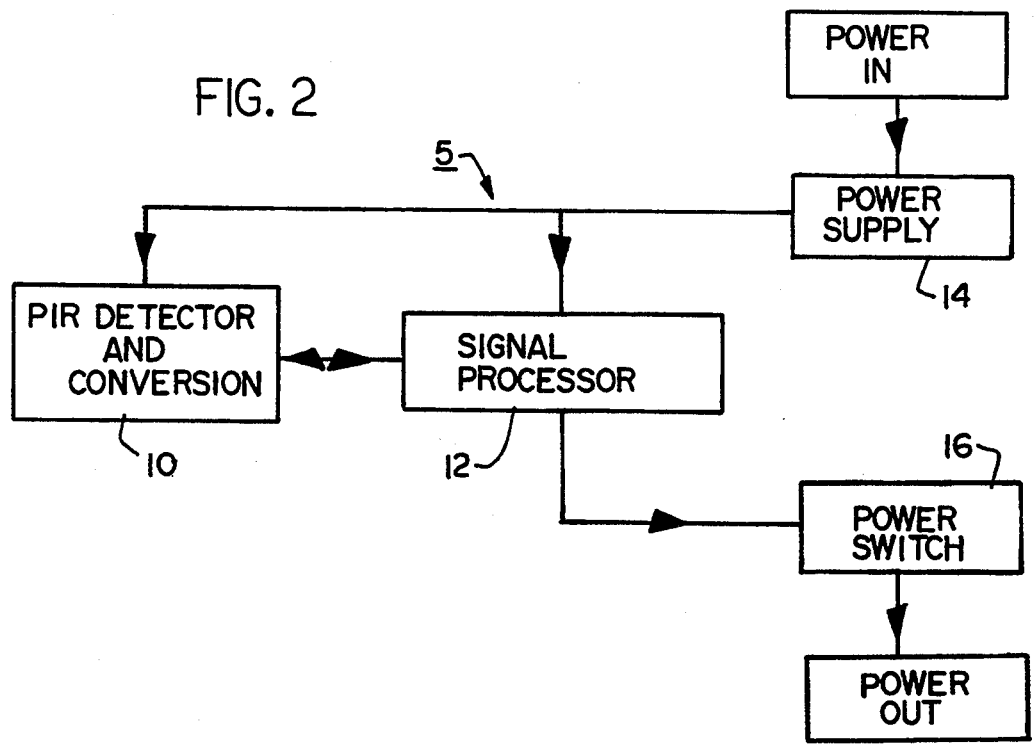
FIG. 2 is a block diagram of a circuit including a passive infrared detection and conversion circuit according to the present invention.

Referring now to the drawings in general, and to FIG. 1 in particular, a preferred embodiment of the passive infrared detection and conversion circuit of the present invention is shown therein. The detection and conversion circuit, denoted generally by the numeral 10, is designed for use in a conventional state-of-the-art control or switching circuit 5, as shown in block diagram form in FIG. 2. Switching circuit 5 includes a power supply 14, signal processor 12, power switch 16, and the aforesaid passive infrared detection and conversion circuit 10. Power supply 14 may be any suitable, conventional power supply device, such as a typical household AC power supply. Signal processor 12 includes a clock/counter and may be any signal processing circuit capable of the functions hereinafter described. In the preferred embodiment, signal processor 12 is a single chip microcontroller such as a type 6805. Signal processor 12 is operable to receive input from power supply 14, and provide output to power switch 16, as well as providing output to and receiving input from circuit 10. Power switch 16 is operable to turn appliances, lights, etc., on and off. It will be appreciated that power switch 16 may be replaced by any device operable to receive and interpret electrical signals from signal processor 12.

Referring now to FIG. 1, passive infrared detector and conversion circuit 10 further includes a pyrosensor, generally 100. Pyrosensor 100 may be any conventional pyrosensor or pyroelectric infrared detector device. Pyrosensor 100 further includes sensors 112,114 and transistor 110. Each of sensors 112,114 typically comprise a ferroelectric element interposed between a pair of electrodes. Notably, the polarities of the currents produced by each sensor are opposed. In conventional fashion, sensors 112,114 each have lenses (not shown) which create a focal point on each of their respective ferroelectric elements. The lenses are designed such that each lens has a different optical field. It will be understood that as an infrared emitter passes by pyrosensor 100, the infrared rays emitted will be concentrated first on the ferroelectric element of one sensor and then on the ferroelectric element of the other sensor. The general effect of this behavior is to create a current flow of one polarity across pyrosensor 100 and then a current flow of the opposite polarity. Resistors 23,24 and capacitor 33 form a bias circuit for pyrosensor 100. Resistors 21,22,26 and capacitor 35 form a bias circuit for transistor 50. Capacitor 32 serves as an AC coupler. Circuit 10 further includes transistor 50 and capacitor 31. It will be understood that transistor 50 may be replaced with any suitable current amplifier device.

Basically, signal processor 12 controls switch 16 in accordance with its programmed logic and signals derived from circuit 10. More particularly, transient currents produced by pyrosensor 100 when it detects motion are used to determine whether sufficient motion has been detected to warrant switching. The current produced by pyrosensor 100 is used to amplify the discharge current of capacitor 31 through transistor 50. Signal processor 12 charges capacitor 31 and then measures the time required for capacitor 31 to discharge through transistor 50 to a threshold voltage level. It will be understood that the transient current from pyrosensor 100 will increase or decrease (depending on the polarity of the current) the rate of discharge of capacitor 31. Signal processor 12 compares the rate of discharge with a "normal" or long-term average rate of discharge to determine whether a significant motion event has occurred. If the measured ratio of discharge is outside the range of an upper and a lower threshold (which is tied to the long-term average), a significant motion event is registered. If other criteria are present, signal processor 12 will activate switch 16. Such criteria may include a minimum number of significant motion events per cycle, a minimum number of cycles, or a particular sequential spread, for example.

The long-term average discharge rate is periodically recalculated as a function of the discharge time of the capacitor. Those of ordinary skill in the art will be able to develop programmed logic to effectuate the aforementioned dynamic adjustment of the value of the long-term average and the algorithm for determining the same, disclosed hereinafter. Because the upper and lower thresholds, are set according to the long-term average, these thresholds also move with respect to the referenced discharge time of the capacitor. Thus, the algorithm of signal processor 12 automatically adjusts to filter out environmental infrared motion "noise" and component valve drift by dynamically setting the signal thresholds. The adjustment is well-suited for filtering out most unwanted signals because such signals typically have a multiple cycle period with constant or slow changes in amplitude over time, regardless of frequency.

The discharge time response of capacitor 31 when motion is detected by pyrosensor 100 can be explained with reference to FIGS. 3-6.

Figure 3:
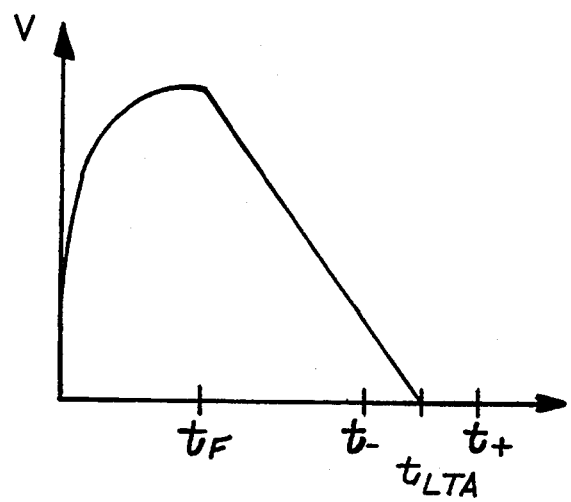
FIGS. 3-5 represent the voltage discharge rate of a capacitor forming a part of the present invention under varying conditions over time.

FIG. 3 shows the "normal" (that is, no motion detected beyond environmental background) or long-term average charging and discharging curve of capacitor 31. The upward sloped portion of the curve (from $t=0$ to $t=t_f$) represents the rate of charge during the time capacitor 31 is being charged by signal processor 12. The downward slope portion of the curve (from $t=t_f$ to $t=t_{LTA}$) represents the rate of discharge of capacitor 31 when no current is being supplied via transistor 50 and charging by signal processor 12 has ceased, $t_{LTA}$ being the time at which capacitor 31 discharges to the threshold voltage. As discussed above, the tolerated environmental background level will vary with external conditions and is represented by the long-term average rate of discharge.

Figure 4:
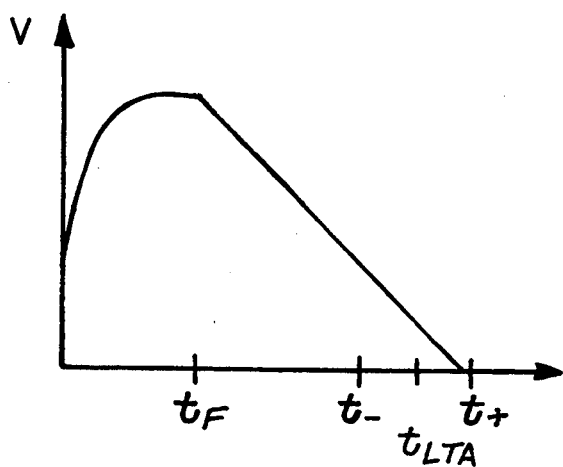

FIG. 4 shows the charge/discharge curve of capacitor 31 when sensor 112 is exposed to motion of an infrared radiation emitting body. Sensor 112 produces a positive current across pyrosensor 100 which is amplified by transistor 50. The subtraction of current from the loop of capacitor 31 slows the rate of discharge of the capacitor. As a result, capacitor 31 requires a longer amount of time (from $t=t_f$ to $t=t_+$) to discharge to the threshold voltage.

Figure 5:
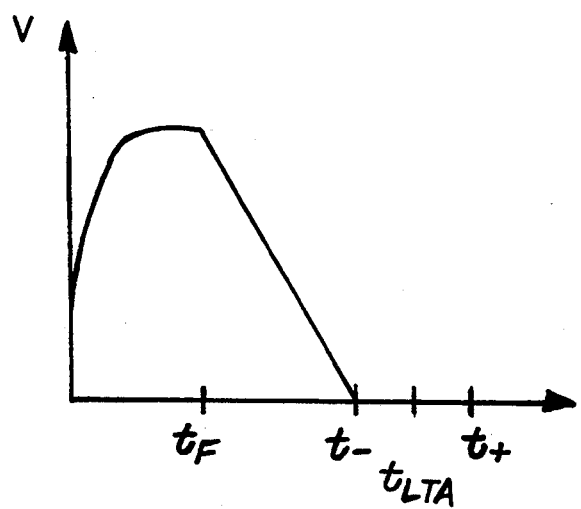

FIG. 5 shows the charge/discharge curve of capacitor 31 when sensor 114 is exposed to motion. Because sensor 114 has a negative polarity, as capacitor 31 discharges through transistor 50, the current transmitted via transistor 50 to the loop of capacitor 31 tends to increase the rate of discharge of capacitor 31. As a result, capacitor 31 requires less time (from $t=t_f$ to $t=t_-$) to discharge to the threshold voltage.

FIG. 6 shows two curves representing the reaction of the pyrosensor and the capacitor, respectively, to an entire motion cycle. The upper curve represents the signal current generated by pyrosensor 100, $I_p$, as a function of time. The lower curve represents the corresponding voltage discharge rates of capacitor 31.

In the preferred embodiment, signal processor 12 is provided with logic to effectuate the following procedure and associated algorithm. First, signal processor 12 supplies a charging current to circuit 10 via an I/O port. The charging current charges capacitor 31 to a first, fully-charged reference voltage. Capacitor 31 is then allowed to discharge through transistor 50 with no current flow through the I/O port of signal processor 12. Signal processor 12 measures the time required for capacitor 31 to discharge from a first, fully-charged reference voltage to second, discharged reference voltage. This delay, the capacitor discharge time, is recorded in the RAM of signal processor 12.

Once the capacitor discharge time has been determined, the long-term average (LTA) of the capacitor discharge time can be updated and the presence of motion can be determined. First, the difference between the most recent capacitor discharge time and the present long-term average is calculated and replaces the capacitor discharge time previously recorded in RAM. The long-term average is updated periodically. Preferably, the capacitor discharge time is sensed 60 times per second and the long-term average is updated 30 times per second. The long-term average is updated by adding a selected fraction of the value recorded in RAM. Since the value recorded in Ram now contains the difference between the current discharge time and the long-term average, the result is that the long-term average is updated according to the equation:

$$LTA_{new} = c_1 \times LTA_{old} + c_2 \times (\text{capacitor discharge time})$$

where $c_2$ is the selected fraction, 1/16 in the preferred embodiment, and the sum of $c_1$ and $c_2$ is equal to 1. Thus, the long-term average is typically affected only slightly by the capacitor discharge time.

The long-term average can only be changed significantly by low frequency signals from the front end of pyrosensor 100. This allows the program to react to motion signals above a given frequency, 0.4 Hz in the preferred embodiment, while compensating for drift in the front end caused by changes in the environment. The long-term average cut-off frequency may be approximated by the equation:

$$f_{LTA} = [0.35 \cdot f_s \cdot \log(15/16)]/\log(0.2)$$

where $f_s$ is the LTA update frequency (30 times per second in the preferred embodiment).

After the long-term average is updated, the presence of motion is determined. If the discharge time of the capacitor was less than the long-term average, then the recorded value will now be a negative number. If so, this number is negated so that the value recorded in RAM always contains a positive number that corresponds to the deviation of the capacitor discharge time from the long-term average. The sensitivity threshold is subtracted from this value and, if the result is negative, then there is no motion present and an energy accumulator for the motion waveform is reset to its starting value.

If the result is not negative, then a significant motion event has occurred and the energy accumulator for the motion waveform is incremented. If the motion waveform energy reaches a set value, then there is enough evidence to assume that there is motion in the detection field. This causes a motion flag to be set and the motion energy is reset to its initial value so that the next iteration can be started from the beginning.

If the energy accumulator has not reached the set value yet, then another iteration is begun without setting the motion flag. If the motion waveform persists, the energy accumulator will probably be incremented to the set value on subsequent iterations and motion will be detected. The requirement that the motion signal be present for multiple cycles of the 60 Hz clock prevents false triggering on spurious signals. If, for example, the energy accumulator is initialized to $-4$ and the set value is 0, then a motion waveform must exist for 4 cycles of the 60 Hz clock in order to activate switch 16. Any signal shorter than this will not cause switch 16 to be activated. Thus, signals with frequencies greater then 7.5 Hz will be ignored. Since the long-term average will compensate for signals with frequencies less then 0.4 Hz, the unit will only react to motion waveforms between 0.4 and 7.5 Hz. The sensitivity threshold and the motion cycle threshold are design choices.

While a specific embodiment has been disclosed, it will be appreciated that a variety of timing and/or pulse sequence patterns may be used as criteria for activating the switch. Further, various specific algorithms may be implemented without departing from the present invention.

Several advantages of the present invention will be appreciated from a reading of the foregoing description of the preferred embodiment. An advantage of the present invention is that it may be designed to sample motion wave forms on the order of 100 times per second. Thus, it may be coupled with a 60 Hz AC cycle input power supply to achieve accurate timing for other purposes. Also, the present invention may be used in conjunction with a standard and available microcontroller rather than a unique or custom-made digital circuit. Further, because the present invention uses only a single current amplifier, a transistor in the preferred embodiment, to interface with the pyrosensor circuit, very little external componentry is required. Because the circuit of the present invention requires only a single, tri-state input/output line from the signal processor, more input/output lines of the signal processor are available for other functions.

The circuit and method of the present invention is capable of compensating for the different tolerances of various components. Particularly, different pyrosensors may be used with a single circuit 10 without requiring any modification to the circuit or the algorithm.

Certain modifications and improvements will occur to those skilled in the art upon a reading of the foregoing description. It should be understood that all such modifications and improvements have been deleted herein for the sake of conciseness and readability, but are properly in the scope of the following claims.

I claim:

1. A passive infrared detection and conversion circuit, comprising:
   a. a pyrosensor
   b. a current amplifier coupled with said pyrosensor;
   c. a capacitor coupled with said amplifier;
   d. a signal processor circuit coupled with said capacitor and being operable to charge said capacitor to a first voltage level and to measure a capacitor discharge time, said capacitor discharge time being the time required for said capacitor to discharge from said first voltage level to a second voltage level, and being further operable to generate an electrical control signal responsive to a variation in said capacitor discharge time which corresponds to a significant motion event.

2. The passive infrared detection and conversion circuit of claim 1 wherein, when said pyrosensor is exposed to infrared motion, it generates a transient current, and wherein said capacitor discharge time corresponds to said transient current.

3. The passive infrared detection and conversion circuit of claim 2 wherein said signal processor circuit includes logic operable to compare said capacitor discharge time with a long-term average capacitor discharge time, and wherein said signal processor circuit generates said electrical control signal only when said capacitor discharge time deviates from said long-term average capacitor discharge time by a predetermined threshold amount.

4. The passive infrared detection and conversion circuit of claim 3 wherein said logic of said signal processor circuit is further operable to calculate and update said long-term average capacitor discharge time based on said capacitor discharge time such that said logic filters out unwanted background signals.

5. The passive infrared detection and conversion circuit of claim 4 wherein said logic calculates and updates said long-term average capacitor discharge time by adding a value corresponding to the difference between said long-term average capacitor discharge time and said capacitor discharge time to said long-term average capacitor discharge time.

6. The passive infrared detection and conversion circuit of claim 1 wherein said current amplifier is a transistor.

7. A method for selectively generating a control signal corresponding to motion of an infrared emitting body, comprising the steps of:
   a. charging a capacitor to a first voltage level;
   b. discharging said capacitor;
   c. measuring a capacitor discharge time, said capacitor discharge time being the time required for said capacitor to discharge from said first voltage level to a second voltage level;
   d. sensing a significant motion event by a pyrosensor and generating a transient current responsive thereto;
   e. transmitting said transient current through a current amplifier;
   f. delivering said amplified current to said capacitor causing a variation in said capacitor discharge time; and,
   g. generating an electrical control signal responsive to said variation in said capacitor discharge time.

8. The method for selectively generating a control signal of claim 7 further including the step of filtering out background signals.

9. The method for selectively generating a control signal of claim 8 further including the steps of calculating and updating a long-term average capacitor discharge time corresponding to said capacitor discharge time and wherein the step of filtering includes comparing said capacitor discharge time to said long-term average capacitor discharge time.

10. The method for selectively generating a control signal of claim 9 wherein the steps of calculating and updating include updating said long-term average capacitor discharge time by adding a value corresponding to the difference between said long-term average capacitor discharge time and said capacitor discharge time to said long-term average capacitor discharge time.

11. The method for selectively generating a control signal of claim 9 wherein the step of filtering further includes the step of comparing said capacitor discharge time with said long-term average capacitor discharge time and generating said control signal if the difference between said capacitor discharge time and said long-term average capacitor discharge time exceeds a predetermined threshold value.

12. A method for selectively generating a control signal, comprising the steps of:
   a. charging a capacitor to a known first voltage level and allowing said capacitor to discharge to a second known voltage level at a known discharge rate;
   b. modifying the known discharge rate of said capacitor in proportion to a current output from an infrared motion detector;
   c. measuring said modified discharge rate of said capacitor; and
   d. generating a control signal corresponding to said modified discharge rate of said capacitor.

13. The method for selectively generating a control signal of claim 12 further including the step of adjusting a signal threshold in accordance with said modified discharge rate of said capacitor to compensate for background signals.

* * * * *